(12) United States Patent
Douhet et al.

(10) Patent No.: US 11,272,303 B2
(45) Date of Patent: *Mar. 8, 2022

(54) MOBILE TERMINAL WITH AT LEAST TWO TRANSDUCERS

(71) Applicant: DRNC Holdings, Inc., Wilmington, DE (US)

(72) Inventors: Gerard Douhet, Fegersheim (FR); Stephane Dufosse, Cormeilles en Parisis (FR); Alain Guillotin, Rueil-Malmaison (FR)

(73) Assignee: DRNC HOLDINGS, INC., Wilmington, DE (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/726,333

(22) Filed: Dec. 24, 2019

(65) Prior Publication Data

US 2020/0145772 A1 May 7, 2020

Related U.S. Application Data

(63) Continuation of application No. 15/843,298, filed on Dec. 15, 2017, now Pat. No. 10,547,959, which is a (Continued)

(30) Foreign Application Priority Data

Feb. 3, 2005 (EP) .................................. 05300088

(51) Int. Cl.
*H04S 1/00* (2006.01)
*H04R 1/26* (2006.01)
(Continued)

(52) U.S. Cl.
CPC ................. *H04S 1/00* (2013.01); *H04M 1/03* (2013.01); *H04M 1/6016* (2013.01); *H04R 1/26* (2013.01);
(Continued)

(58) Field of Classification Search
CPC combination set(s) only.
See application file for complete search history.

(56) References Cited

U.S. PATENT DOCUMENTS 5,809,153 A * 9/1998 Aylward ................. H04R 1/20
381/160
5,970,153 A 10/1999 Petroff
(Continued)

OTHER PUBLICATIONS

United States Office Action, U.S. Appl. No. 13/309,903, filed Dec. 17, 2013, 16 pages.
(Continued)

*Primary Examiner* — Akelaw Teshale
(74) *Attorney, Agent, or Firm* — Eric Berkowitz

(57) ABSTRACT

The invention concerns a mobile terminal with at least two transducers (LSm, LSs1, LSS2) used simultaneously as loudspeakers for stereophonic effect. According to the invention, one of said transducers is a main transducer (LSm) with a main working frequency band (Bm) corresponding to at least the phone frequency band, while the other transducer is a secondary transducer (LSs1; LSs2) with a secondary working frequency band (Bs1; Bs2) band different from said main frequency band, the lowest frequencies of said secondary working frequency band (Bs1; Bs2) being greater than the lowest frequencies of said main working frequency band.

11 Claims, 2 Drawing Sheets

Related U.S. Application Data continuation of application No. 14/522,206, filed on Oct. 23, 2014, now Pat. No. 9,888,332, which is a continuation of application No. 13/309,903, filed on Dec. 2, 2011, now Pat. No. 8,897,471, which is a continuation of application No. 11/336,605, filed on Jan. 19, 2006, now Pat. No. 8,094,845.

(51) Int. Cl.
| | |
|---|---|
| H04R 3/12 | (2006.01) |
| H04R 1/40 | (2006.01) |
| H04R 1/32 | (2006.01) |
| H04M 1/60 | (2006.01) |
| H04M 1/03 | (2006.01) |
| H04R 1/22 | (2006.01) |
| H04R 5/02 | (2006.01) |
| H04R 1/24 | (2006.01) |
| H04M 1/72442 | (2021.01) |

(52) U.S. Cl.
CPC ............... *H04R 1/32* (2013.01); *H04R 1/40* (2013.01); *H04R 3/12* (2013.01); *H04M 1/72442* (2021.01); *H04R 1/225* (2013.01); *H04R 1/24* (2013.01); *H04R 5/02* (2013.01)

(56) References Cited

U.S. PATENT DOCUMENTS

| | | | |
|---|---|---|---|
| 6,349,285 | B1 | 2/2002 | Liu et al. |
| 7,242,785 | B2 | 7/2007 | McNary |
| 10,547,959 | B2* | 1/2020 | Douhet ................ H04R 1/40 |
| 2001/0006336 | A1 | 7/2001 | Yi et al. |
| 2001/0011993 | A1* | 8/2001 | Saarinen .............. H04R 5/04 345/156 |
| 2002/0042287 | A1 | 4/2002 | Asami |
| 2003/0021428 | A1* | 1/2003 | Abe .................... H04R 1/403 381/97 |
| 2003/0233589 | A1* | 12/2003 | Alvarez ................ G06F 1/263 713/300 |
| 2004/0087346 | A1 | 5/2004 | Johannsen et al. |
| 2004/0204194 | A1* | 10/2004 | Akai ................. H04N 21/4223 455/575.1 |
| 2005/0014537 | A1 | 1/2005 | Gammon et al. |
| 2005/0079885 | A1* | 4/2005 | Patino ................ H04M 1/6066 455/518 |
| 2005/0254678 | A1 | 11/2005 | Wearing |
| 2006/0079271 | A1* | 4/2006 | Lee ..................... H04M 1/60 455/550.1 |
| 2006/0089170 | A1* | 4/2006 | Ashman .......... H04M 1/72403 455/556.1 |
| 2006/0115090 | A1* | 6/2006 | Kirkeby ............... H04S 1/002 381/17 |

OTHER PUBLICATIONS

European Search Report, EP Application No. 05300088, dated Jun. 30, 2005, 2 pages.

United States Office Action, U.S. Appl. No. 11/336,605, filed Apr. 13, 2010, 14 pages.

United States Office Action, U.S. Appl. No. 11/336,605, filed Oct. 16, 2009, 13 pages.

United States Final Office Action, U.S. Appl. No. 14/522,206, filed Dec. 9, 2016, 10 pages.

* cited by examiner

MOBILE TERMINAL WITH AT LEAST TWO TRANSDUCERS

RELATED APPLICATION

This application is a continuation of U.S. patent application Ser. No. 15/843,298, filed Dec. 15, 2017, which is a continuation of U.S. patent application Ser. No. 14/522,206 filed Oct. 23, 2014, now U.S. Pat. No. 9,888,332, which is a continuation of U.S. patent application Ser. No. 13/309,903 filed Dec. 2, 2011, now U.S. Pat. No. 8,897,471, which is a continuation of U.S. patent application Ser. No. 11/336,605 filed Jan. 19, 2006, now U.S. Pat. No. 8,094,845, which claims the benefit of priority to European Patent Application No. 05 300 088.1, filed on Feb. 3, 2005, the contents of each being incorporated by reference as if fully set forth herein.

FIELD OF THE INVENTION

The present invention concerns a mobile terminal provided with several (at least two) transducers used as loudspeakers for stereophonic effect. More generally, the invention relates to all mobile apparatus provided with functionalities to play sound signal (voice signals or melodies), such as mobile phones, or Personal Digital Assistants, or audio recorders.

BACKGROUND

All existing mobile telephones include a transducer used as an earphone for listening to the voice of a caller. Some mobile phone are also provided with a transducer used as a loudspeaker for hand-free communication. This transducer is generally the same than the one used as earphone. In both cases, usual transducer works in a standardized phone frequency band which corresponds to the audio bandwidth of the voice signal, i.e. between 300 Hz and 3400 Hz, or between 100 Hz and 8000 Hz for wide band telephony More recently, mobile phones used for playing melodies (either ringing melodies but also all kind of sound signals) have been proposed. In some cases, the same transducer is used as earphone, hand-free loudspeaker, and melody player. However, the useful frequency bandwidth of music is between 20 Hz and 20 KHz, which includes the above-mentioned standardized phone frequency band, but is much greater towards both the low frequencies and the high frequencies. As a consequence, specific transducers have been developed in order to obtain a good sound for music with only one transducer. Generally, these specific transducers have an important size in order to be able to restitute a good sound, especially for the low frequencies.

Now, in order to obtain a stereo effect, it is necessary to provide the mobile terminal with at least two transducers used as loudspeakers. It is already known to provide a mobile phone with two identical transducers used as loudspeakers for stereophonic effect, with the same working frequency band. However, a compromise has to be made between, on the one hand, the wish to have a good stereo effect, even for music, and, on the other hand, the bulk constraint. This is especially true in the domain of the mobile phones wherein the tendency is to miniaturize as much as possible the total size of the phone while keeping some important features such as a large screen and a keypad.

Consequently, known mobile phones do not enable to obtain a good stereophonic effect for all kind of sound signals, especially for music.

OBJECTS AND SUMMARY

The aim of the invention is to remedy the above drawback by proposing a solution enabling a very good stereophonic effect with a small size apparatus.

To this aim, an object of the present invention is to provide a mobile terminal with at least two transducers used simultaneously as loudspeakers for stereophonic effect, characterized in that one of said transducers is a main transducer with a main working frequency band corresponding to at least the phone frequency band, while the other transducer is a secondary transducer with a secondary working frequency band different from said main frequency band, the lowest frequencies of said secondary working frequency band being greater than the lowest frequencies of said main working frequency band.

In a first embodiment of the invention, said mobile terminal comprises only said main transducer and a single secondary transducer, and said main working frequency band includes said secondary working frequency band.

In a second embodiment of the invention said mobile terminal comprises said main transducer and at least two secondary transducers with substantially identical secondary working bands, and the highest frequencies of said main working frequency band correspond to the lowest frequencies of said secondary working frequency band.

BRIEF DESCRIPTION OF THE DRAWINGS

Other features and advantages of the invention become apparent from the following description of two embodiments of the invention given by way of non-limiting examples only and with reference to the accompanying drawings, in which.

DETAILED DESCRIPTION

Figure 1:
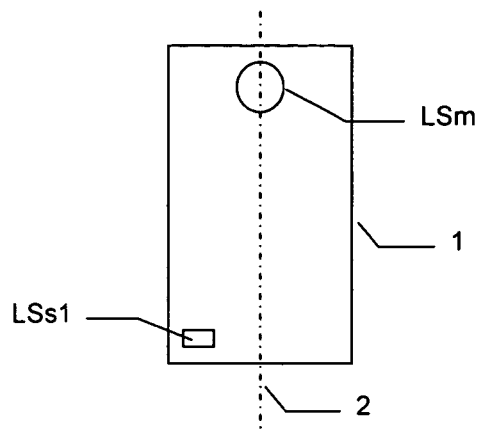
FIG. 1 shows schematically a first embodiment in accordance with the invention.
Figure 2:
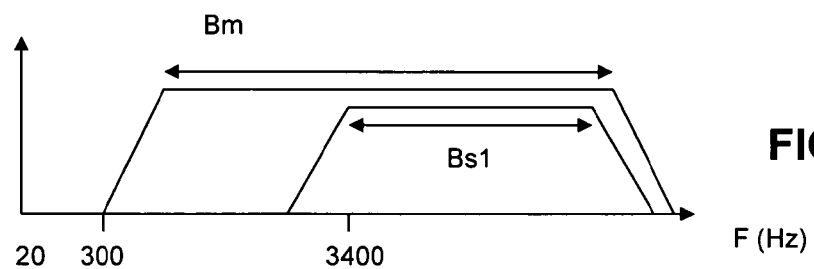
FIG. 2 shows the relative positions of the working frequencies bands for the transducers of the first embodiment.

In relation with FIG. 1, which represents a first possible embodiment according to the invention, a mobile terminal, for instance a mobile phone, is provided with two transducers used simultaneously as loudspeakers for stereophonic effect. One of the transducers, called in the following "main transducer" LSm, is chosen in order that its working frequency band Bm includes the phone frequency band, which is a standardized band between for instance 300 Hz and 3400 Hz. In the example of FIG. 2, the lowest frequencies of main working band Bm correspond substantially to the lowest frequencies of the phone frequency band. However, the lowest frequencies may also be less than the lowest frequencies of the phone frequency band. The other transducer, called in the following "secondary transducer" LSs1, is chosen in order that its working frequency band Bs1 is located in the upper part of the frequency spectrum. More precisely, as can be seen in FIG. 2, the lowest frequencies of secondary working band Bs1 are greater than the lowest frequencies of said main working frequency band Bm. In order to obtain the stereophonic effect with only the two preceding transducers, main working frequency band Bm also includes the secondary working frequency band Bs1.

Tests made by the Applicant with the above embodiment give good results for stereophonic effects, not only for the voice signal, but also for music, since secondary frequency band Bs1 is chosen at the upper part of the frequency spectrum, with higher frequencies which can go up to 20 KHz.

In addition, it is not necessary to enlarge the size of the secondary transducer since its working frequency band is at high frequencies.

In order to reinforce the stereophonic effect, main transducer LSm and secondary transducer LSs1 are preferably located as far as possible from each other. As best shown in FIG. 1, the mobile terminal comprises a housing 1 of parallelepipedic general form extending along a longitudinal axis 2. It is thus possible to put main transducer LSm and secondary transducer LSs1 inside said housing 1 as far as possible from each other along the direction of said longitudinal axis 2. In this case, the user will get a maximum stereophonic effect by putting the mobile terminal down on a plane surface so that longitudinal axis 2 is parallel to the plane surface.

Since main frequency band includes at least the phone frequency band, main transducer LPm can also be used for other classical functions of a phone handset, especially as an earphone and/or an hand-free loudspeaker.

Figure 3:
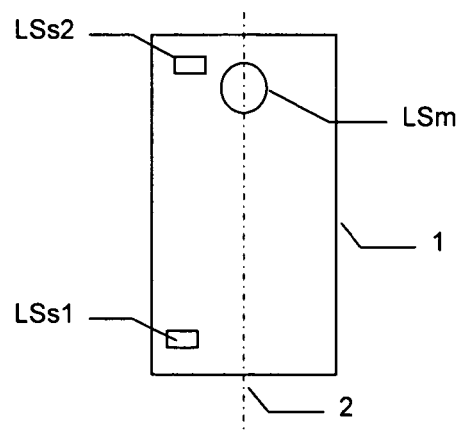
FIG. 3 shows schematically a second embodiment in accordance with the invention.
Figure 4:
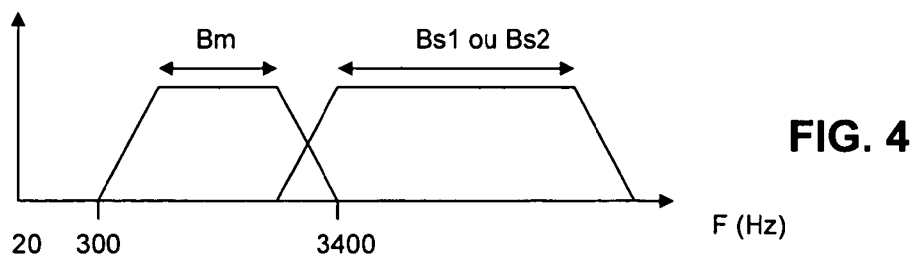
FIG. 4 shows the relative positions of the working frequencies bands for the transducers of the second embodiment.

FIGS. 3 and 4 show a second embodiment according to the invention wherein the mobile terminal is provided with a main transducer LSm and two secondary transducers LSs1, LSs2, with substantially identical secondary working bands Bs1, Bs2. As in the previous first embodiment, the lowest frequencies of main working band Bm may correspond substantially to the lowest frequencies of the phone frequency band, and secondary working frequency bands Bs1 and Bs2 are located in the upper part of the frequency spectrum, so that the lowest frequencies of secondary working bands Bs1 and Bs2 are greater than the lowest frequencies of said main working frequency band Bm. However, since the stereophonic effect is mainly due to secondary transducers, it is not necessary in this embodiment that main band Bm includes also secondary bands Bs1 and Bs2. In a different manner, as can be seen in FIG. 4, the highest frequencies of said main working frequency band correspond to the lowest frequencies of said secondary working frequency bands.

In order to reinforce the stereophonic effect, secondary transducers LSs1 and LSs2 are preferably located as far as possible from each other. As best shown in FIG. 3, it is possible to put secondary transducers LSs1 and LSs2 inside housing 1 as far of possible from each other along the direction of said longitudinal axis 2. As already mentioned with respect to first embodiment, the user will get a maximum stereophonic effect by putting the mobile terminal down on a plane surface so that longitudinal axis 2 is parallel to the plane surface.

In addition, since main frequency band Bm corresponds substantially to the phone frequency band, main transducer LPm can be the transducer classically used in a phone handset as an earphone and/or an hand-free loudspeaker.

Figure 5A:
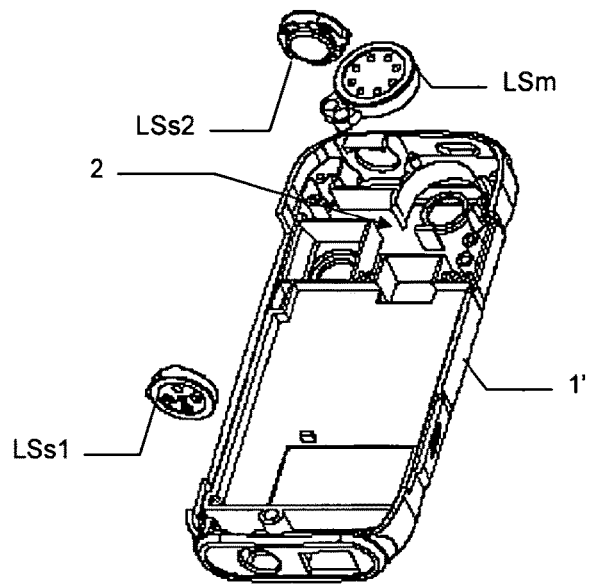
FIG. 5a and FIG. 5b a half-part of a housing provided with three transducers according to the second embodiment of the invention.
Figure 5B:
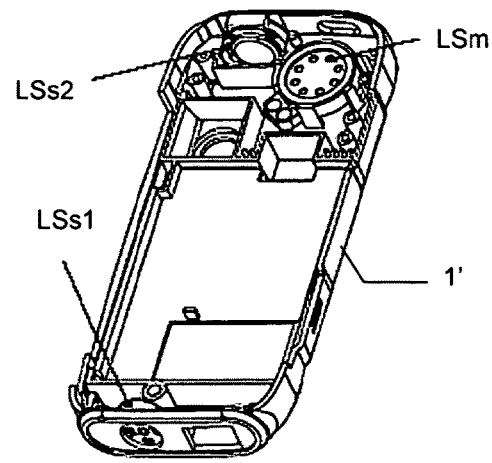

FIGS. 5a and 5b illustrate a mobile handset provided with three transducers according to the second embodiment of the invention. For better understanding, the upper half-part of the housing has been removed in order to see the inside part of the housing. FIG. 5a shows main transducer LSm and secondary transducers LSs1 and LSs2 before insertion inside the lower half-part 1' of the housing, while FIG. 5b shows the same components once inserted inside said lower half part. One should note that secondary transducers LSs1 and LSs2 are smaller than main transducer LSm. Accordingly, a good stereophonic effect can be obtained thanks to the invention while keeping in mind the bulk constraint. As can be seen especially from FIG. 5a, it is generally necessary to place main transducer LSm inside an airtight cavity 2 in order to reduce acoustic short-circuits due to a recombination of sound waves originated from both the rear side and the front side of the transducer. However, the acoustic short-circuits phenomena is especially true for low frequencies corresponding to low sounds. Since, according to the invention, the secondary working frequency bands are chosen in the upper part of the frequency spectrum, it is not necessary to make provision of such airtightness for the secondary transducers. Consequently, secondary transducers can be located advantageously at very extreme positions inside the housing.

Transducers used as main transducer and secondary transducers can be of any kind, such as electro-mechanical transducers, or piezo transducers.

Figure 6:
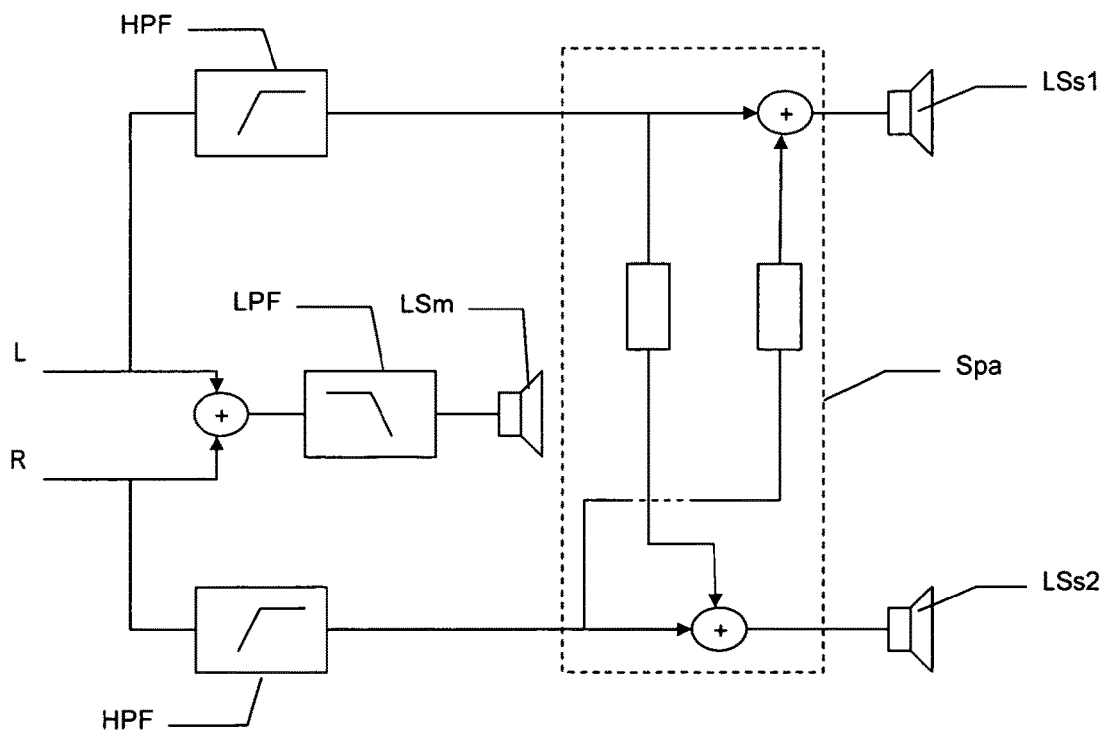
FIG. 6 shows a synoptic explaining a possible signal processing for the second embodiment.

In addition to the foregoing features described in relation with FIGS. 1 through 5b, a reinforced stereophonic effect can also be obtained with particular signal processing of the signals provided to the different transducers. FIG. 6 shows a synoptic explaining the signal processing which can be made in the case corresponding to the second embodiment. In this figure, it is assumed that the sound signal which is to be played is a stereo signal represented by its right and left channels R and L. However, it must be understood that a better stereophonic effect is obtained even in case the sound signal is not a stereo signal. Both channels R and L are classically recombined for delivering to main transducer LSm. Between the combination means and main transducer LSm, a low pass filter LPF can be introduced. Each of the right and left channels are also connected to one of said secondary transducers, respectively LSs1 and LSs2, through high pass band filters HPF. The characteristics of the different filters LPF and HPF will depend on the used transducers but also on the environment of each transducer. Accordingly, high pass filters HPF could be different. The signals delivered by said high pass filter can be delivered directly to each secondary transducer LSs1 and LSs2. It is also possible to further increase the stereophonic effect by implementing well-known spatialization algorithms. This is shown on FIG. 6 with reference Spa, consisting in combining on each channel part of the signal taken on the other channel after specific filtering. The above signal processing can also be adapted for a mobile terminal according to the first embodiment.

The invention claimed is:

1. A wireless transmit/receive unit (WTRU) comprising:
a housing extending in a longitudinal direction, extending in a width direction, and extending in a depth direction, the housing having: (1) a first surface extending in at least the longitudinal and width directions and (2) a second surface extending in at least the width and depth directions, the first surface defining a first opening and the second surface defining a second opening;
a first transducer configured to: (1) produce first sound from a first audio signal, and (2) direct the first sound in a first direction through the first opening in the housing; and a second transducer configured to: (1) produce second sound from a second audio signal, and (2) direct the second sound in a second direction through the second opening in the housing;

wherein:
the first transducer and the second transducer are configured to produce stereophonic sound,
the first opening is centered in the housing with respect to the width direction, and
the second opening is offset from a center of the housing with respect to the width direction.

2. The WTRU of claim 1, wherein:
the first transducer is configured to operate in a first portion of a frequency band; and
the second transducer is configured to operate in a second portion of the frequency band that overlaps with the first portion of the frequency band.

3. The WTRU of claim 1, wherein the second transducer is located at one edge within the housing.

4. The WTRU of claim 1, wherein:
the first transducer is configured to receive the first audio signal; and
the second transducer is configured to receive the second audio signal.

5. The WTRU of claim 1, wherein the first transducer, positioned in the housing, is adjacent the first opening associated with the first surface and the second transducer, positioned in the housing, is adjacent the second opening associated with the second surface.

6. The WTRU of claim 1, wherein the first direction is different from the second direction.

7. The WTRU of claim 1, wherein the first transducer and the second transducer are positioned sufficiently remote from each other to produce, from the first audio signal and the second audio signal, the stereophonic sound.

8. The WTRU of claim 1, wherein the first transducer is configured to operate as an earphone in a first mode and as a loudspeaker in a second mode.

9. The WTRU of claim 1, wherein the second transducer is offset from the center of the housing with respect to the width direction.

10. The WTRU of claim 1, wherein a maximum stereophonic effect is substantially achieved on condition that the WTRU is adjacent to a plane surface and the longitudinal direction is parallel to the plane surface.

11. The WTRU of claim 1, wherein the first transducer and the second transducer are any of: electro-mechanical transducers or piezo transducers.

* * * * *